US011237909B2

(12) United States Patent
Enenkel et al.

(10) Patent No.: US 11,237,909 B2
(45) Date of Patent: *Feb. 1, 2022

(54) LOAD EXPLOITATION AND IMPROVED PIPELINEABILITY OF HARDWARE INSTRUCTIONS

(71) Applicants: International Business Machines Corporation, Armonk, NY (US); Christoper Anand, Hamilton (CA); Adele Olejarz, Dundas (CA); Lucas Dutton, Hamilton (CA)

(72) Inventors: Robert F. Enenkel, Markham (CA); Christopher Anand, Dundas (CA); Adele Olejarz, Hamilton (CA); Lucas Dutton, Hamilton (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,887

(22) Filed: Aug. 21, 2020

(65) Prior Publication Data

US 2020/0379847 A1 Dec. 3, 2020

Related U.S. Application Data

(63) Continuation of application No. 16/123,761, filed on Sep. 6, 2018, now Pat. No. 10,776,207.

(51) Int. Cl.
*G06F 11/14* (2006.01)
*G06F 7/483* (2006.01)
(Continued)

(52) U.S. Cl.
CPC .......... *G06F 11/1405* (2013.01); *G06F 7/483* (2013.01); *G06F 7/4988* (2013.01); *G06F 7/544* (2013.01); *G06F 9/30043* (2013.01)

(58) Field of Classification Search
None
See application file for complete search history.

(56) References Cited

U.S. PATENT DOCUMENTS 6,282,557 B1 * 8/2001 Dhong ................. G06F 7/5443
708/501
7,499,962 B2 3/2009 Tang et al.
(Continued)

OTHER PUBLICATIONS

Nievergelt, Y., Scalar Fused Multiply-Add Instructions Produce Floating Point Matrix Arithmetic Provably Accurate to the Penultimate Digit, 2003, ACM, ACM Trans. on Mathematical Software, vol. 29, No. 1, pp. 27-48. (Year: 2003).*

(Continued)

*Primary Examiner* — Eric Coleman
(74) *Attorney, Agent, or Firm* — Scully, Scott, Murphy & Presser, P.C.

(57) ABSTRACT

A method, computer program product, and a computer system are disclosed for processing information using hardware instructions in a processor of a computer system by performing a hardware reduction instruction using an input to calculate at least one range reduction factor of the input; performing a hardware restoration instruction using the input to calculate at least one range restoration factor of the input; and performing a final fused multiply add (FMA) type of hardware instruction or a multiply (FM) hardware instruction by combining an approximation based on a value reduced by the at least one range reduction factor with the at least one range restoration factor.

25 Claims, 5 Drawing Sheets

(51) Int. Cl.
*G06F 9/30* (2018.01)
*G06F 7/544* (2006.01)
*G06F 7/498* (2006.01)

(56) References Cited

U.S. PATENT DOCUMENTS

| | | | |
|---|---|---|---|
| 8,429,217 B2* | 4/2013 | Schmookler | G06F 7/535 |
| | | | 708/504 |
| 8,914,801 B2 | 12/2014 | Anand et al. | |
| 10,331,162 B2* | 6/2019 | Shah | G06F 7/544 |
| 2003/0158879 A1* | 8/2003 | Kwon | G06F 7/5443 |
| | | | 708/603 |
| 2005/0204194 A1 | 9/2005 | Curry | |
| 2009/0158012 A1 | 6/2009 | Hansen et al. | |
| 2011/0296146 A1* | 12/2011 | Anand | G06F 7/483 |
| | | | 712/222 |
| 2013/0054665 A1 | 2/2013 | Felch | |
| 2014/0244704 A1* | 8/2014 | Dao Trong | G06F 7/483 |
| | | | 708/501 |
| 2017/0003966 A1 | 1/2017 | Haraden et al. | |
| 2017/0060532 A1 | 3/2017 | Ahmed | |
| 2017/0351525 A1 | 12/2017 | Wang et al. | |

OTHER PUBLICATIONS

List of IBM Patents or Patent Applications Treated as Related, dated Aug. 21, 2020, 2 pages.

\* cited by examiner

LOAD EXPLOITATION AND IMPROVED PIPELINEABILITY OF HARDWARE INSTRUCTIONS

BACKGROUND

Mathematical functions, such as square root, logarithm, exponential, etc., elementary functions, and special functions are typically used in high-performance computing, scientific computing, financial applications, and machine learning. Overall application performance of computer processing hardware often depends upon mathematical functions, making accelerated mathematical libraries, such as IBM MASS (Mathematical Acceleration Subsystem), an important factor in achieving high performance processing systems.

Two types of hardware instructions, such as a lookup instruction and an extended fused multiply add (fmaX) instruction, enable suitable algorithms when computing a variety of mathematical functions. Typically, these instructions are performed in a monolithic fashion. However, to perform these instructions in a monolithic fashion, a processor requires a larger chip area and the opportunity for pipelining the instructions and resulting functional parallelism is reduced. Moreover, functional verification of these hardware instructions is expensive as there are numerous inputs to be tested.

SUMMARY

This disclosure relates generally to computer processing, and more particularly, to instructions implemented in processor hardware that achieve significant processing performance and improved accuracy when computing a variety of mathematical functions.

The summary of the disclosure is given to aid understanding of a computer system, computer architectural structure, processor, and method of performing instructions in hardware of a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

According to one or more embodiments of the present disclosure, a method of processing information using hardware instructions in a processor of a computer system is disclosed. The method in an aspect includes performing a hardware reduction instruction using an input to calculate a range reduction factor of the input. The method in an aspect includes performing a hardware restoration instruction using the input to calculate a range restoration factor of the input. The method in an aspect includes performing a final fused multiply add (FMA) type of hardware instruction or a floating-point multiply (FM) hardware instruction by combining the result of an approximation based on a value reduced by the range reduction factor, with the range restoration factor. In one or more aspects, the processor includes at least load hardware. In one or more aspects, the input is an argument at which a function is evaluated. In one or more aspects, the input is a SIMD vector (or a pair or multiplicity of SIMD vectors), whose slots contain arguments at which a function is to be evaluated.

According to one or more embodiments of the present disclosure, an information handling system including a memory and one or more processors having at least load hardware is disclosed. In an aspect, the one or more processors are configured and adapted to receive an input, in which the input is an argument at which a function is evaluated. In an aspect, the one or more processors are configured and adapted to generate, using the input, a lookup key, via a table index instruction. In an aspect, the one or more processors are configured and adapted to perform a first load hardware instruction, using the lookup key as a first load hardware instruction input, by loading memory addresses of data into one or more registers. In an aspect, the one or more processors are configured and adapted to perform a hardware reduction instruction using the input, and the output of the first load hardware instruction, as inputs to calculate at least one range reduction factor. In an aspect, the one or more processors are configured and adapted to perform a second load hardware instruction, using the lookup key as a second load hardware instruction input, by loading memory addresses of data into the one or more registers. In an aspect, the one or more processors are configured and adapted to perform a hardware restoration instruction using the input, and the output of the second load hardware instruction, as inputs to calculate at least one range restoration factor. In an aspect, the one or more processors are configured and adapted to perform a final FMA type of hardware instruction or a FM hardware instruction by combining the result of an approximation based on a value reduced by the at least one range reduction factor, with the at least one range restoration factor. In one or more aspects, the lookup key provides memory addresses of data to be loaded into the one or more registers.

According to one or more embodiments of the present disclosure, an information handling system includes a memory and one or more processors having at least load hardware. In an aspect, the one or more processors are configured and adapted to receive an input, in which the input is an argument at which a function is evaluated. In an aspect, the one or more processors are configured and adapted to perform a hardware reduction instruction. In one or more aspects, the hardware reduction instruction includes: generating, using the input, a first lookup key for a first load hardware operation, the first lookup key providing memory addresses of data to be loaded into one or more registers; performing the first load hardware operation, using the first lookup key as a first load hardware operation input, by loading memory addresses of data into the one or more registers; and processing a result of the first load hardware operation to calculate at least one range reduction factor. In an aspect, the one or more processors are configured and adapted to perform a hardware restoration instruction. In one or more aspects, the hardware restoration instruction includes: generating, using the input, a second lookup key for a second load hardware operation, the second lookup key providing memory addresses of data to be loaded into the one or more registers; performing the second load hardware operation, using the second lookup key as a second load hardware operation input, by loading memory addresses of data into the one or more registers; and processing a result of the second load hardware operation to calculate at least one range restoration factor. In an aspect, the one or more processors are configured and adapted to perform a final FMA type of hardware instruction or a FM hardware instruction by combining the result of an approximation based on a value reduced by the at least one range reduction factor, with the at least one range restoration factor.

According to one or more embodiments of the present disclosure, an information handling system includes a memory and one or more processors having at least load hardware. In an aspect, the one or more processors are configured and adapted to: receive an input, in which the input is an argument at which a function is evaluated. In an aspect, the one or more processors are configured and adapted to perform, using the input, a first table index instruction. In one or more aspects, the first table index instruction includes: generating a first lookup key providing memory addresses of data to be loaded into one or more registers; and performing a first load hardware operation, using the first lookup key as a first load hardware operation input, by loading the memory addresses of data into the one or more registers. In an aspect, the one or more processors are configured and adapted to perform a hardware reduction instruction using the input, and a result of the first load hardware operation, as inputs to calculate at least one range reduction factor. In an aspect, the one or more processors are configured and adapted to perform, using the input, a second table index instruction. In one or more aspects, the second table index instruction includes: generating a second lookup key providing memory addresses of data to be loaded into the one or more registers; and performing a second load hardware operation, using the second lookup key as a second load hardware operation input, by loading the memory addresses of data into the one or more registers. In an aspect, the one or more processors are configured and adapted to perform a hardware restoration instruction using the input, and a result of the second load hardware operation, as inputs to calculate a range restoration factor. In an aspect, the one or more processors are configured and adapted to perform a final FMA type of hardware instruction or a FM hardware instruction by combining the result of an approximation based on a value reduced by the at least one range reduction factor with the at least one range restoration factor.

According to one or more embodiments of the present disclosure, a computer program product includes: a non-transitory computer-readable storage medium having program instructions embodied therewith. In some aspects, the program instructions are executable by one or more processors having at least load hardware. In one or more aspects, the program instructions include performing, using an input, a table index instruction by generating a lookup key, in which the input is an argument at which a function is evaluated. In one or more aspects, the program instructions include performing a hardware reduction instruction to calculate at least one range reduction factor. In one or more aspects, the program instructions include performing a hardware restoration instruction to calculate at least one range restoration factor. In one or more aspects, the program instructions include performing a final FMA type of hardware instruction or a FM hardware instruction by combining the result of an approximation based on a value reduced by the at least one range reduction factor with the at least one range restoration factor.

According to one or more embodiments of the present disclosure, a computer-implemented process for accelerated table-lookup based mathematical functions is disclosed. In one or more aspects, the computer-implemented process includes in a computing environment having load hardware, adding to an instruction set of a processor, a set of lookup instructions. In one or more aspects, the set of lookup instructions includes a first instruction to prepare data in a lookup for reduction for a second instruction. In one or more aspects, the second instruction performs an existing load operation. In one or more aspects, the set of lookup instructions includes a third instruction to perform after the load operation in a lookup for restoration. In one or more aspects, the set of lookup instructions exploit the load hardware on the processor implementation of the load hardware. In one or more aspects, the set of lookup instructions avoid functional overlap with an existing load operation thereby requiring a reduced chip area. In one or more aspects, the set of lookup instructions separate required operations of original lookup instructions into the set of lookup instructions enabling pipelined execution, associated functional parallelism, and enabling simple functional verification of the first instruction and third instruction.

The foregoing and other objects, features and advantages of the embodiments discussed herein will be apparent from the following more particular descriptions as illustrated in the accompanying drawings, in which like reference numbers generally represent like parts of the embodiments.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, systems, embodiments, or devices shown, and the arrangements, structures, subassemblies, features, aspects, methods, processes, embodiments, and devices shown may be used singularly or in combination with other arrangements, structures, assemblies, subassemblies, systems, features, aspects, embodiments, methods, processes, and devices.

DETAILED DESCRIPTION

The following description is made for illustrating the general principles of the embodiments discussed herein and is not meant to limit the inventive concepts claimed herein. In the following detailed description, numerous details are set forth in order to provide an understanding of the computer system, computer architectural structure, processor, and their method of operation, however, it will be understood by those skilled in the art that different and numerous embodiments of the computer system, computer architectural structure, processor, and their method of operation may be practiced without those specific details, and the claims and disclosure should not be limited to the embodiments, subassemblies, features, processes, methods, aspects, instructions, or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, instructions, circuitry, steps, operations, elements, and/or components, but do not preclude the presence or addition of one or more other features, integers, instructions, circuitry, steps, operations, elements, components, and/or groups thereof.

The following discussion omits or only briefly describes conventional features of information processing systems, including processors and microprocessor systems and architectures, which are apparent to those skilled in the art. It is assumed that those skilled in the art are familiar with the general architecture of processors, and in particular with processors which operate in an out-of-order execution fashion. It may be noted that a numbered element is numbered according to the figure in which the element is introduced, and is typically referred to by that number throughout succeeding figures.

Exemplary methods, apparatus, instructions, circuitry, and products for performing instructions on one or more processors, and in particular, for performing instructions in hardware of a processor that achieve significant processing performance and improved accuracy when computing mathematical functions are described further below with reference to the Figures.

Figure 1:
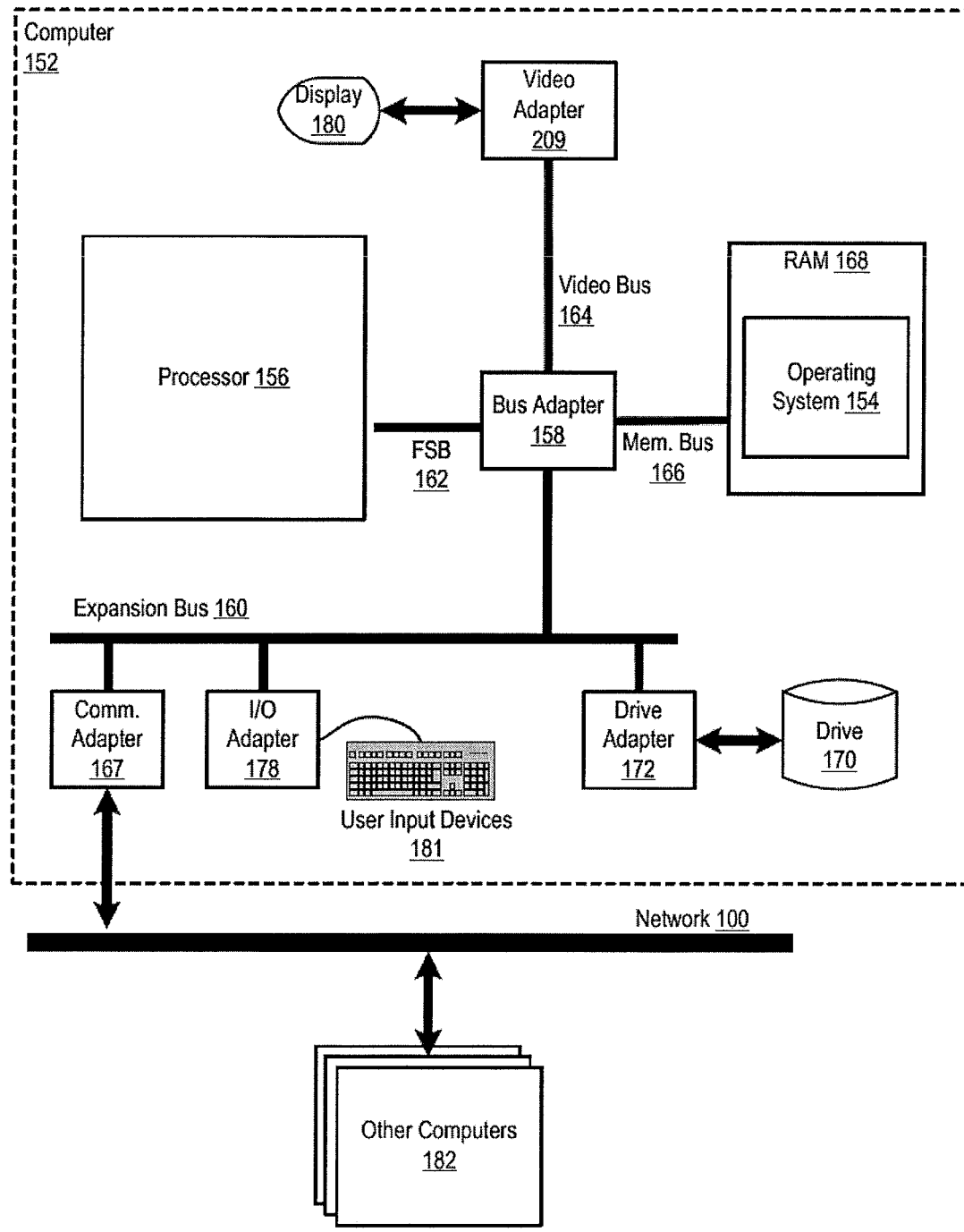
FIG. 1 is a functional block diagram illustrating computer processing hardware, according to embodiments of the present disclosure.

FIG. 1 is a functional block diagram illustrating computer processing hardware 10. The computer processing hardware 10 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152. In one or more embodiments, RAM 168 may be an embedded dynamic random access memory (eDRAM). In one or more embodiments, RAM 168 may be utilized by units, such as processing cores, on the processor 156.

In one or more embodiments, the processor 156 includes load hardware to implement load hardware instructions. For example, the processor 156 includes gather load hardware to implement gather load hardware instructions. The processor 156 may be implemented as a multi-slice processor. The term "multi-slice" may refer to a processor having a plurality of similar or identical sets of components, in which each set of components may operate independently of all the other sets or in concert with the one or more of the other sets.

Although the processor 156 is shown to be coupled to RAM 168 through the front side bus 162, the bus adapter 158, and the high speed memory bus 166, those of ordinary skill in the art will recognize that such configuration is only an exemplary implementation and other configurations of coupling the processor 156 to other components of the system 10 may be utilized. For example, in one or more embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™ Linux™, Microsoft Windows™, AIX™, IBM™'s z/OS™, and others known to those of ordinary skill in the art. In addition to the operating system 154 and the data processing application 102 being located in RAM 168, other components of such software may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 100. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

In one or more embodiments, one or more instructions of the first implementation 200, second implementation 300, third implementation 400, and fourth implementation 500 discussed in FIGS. 2-5 are a part of the hardware of the processor 156. In one or more embodiments, the one or more instructions may be implemented as logic gates on the processor 156. In one or more embodiments, a program, stored in a memory of the computer 152, may invoke the one or more instructions for implementing one or more math functions (e.g., logarithm). In one or more embodiments, the instructions are invoked on execution units of the processor 156. In one or more embodiments, load instructions or load operations, discussed in FIGS. 2-5, include various types of load instructions and/or operations, such as a simple load, gather load, hardware optimized specialized load. In some embodiments, the types of load instructions and/or operations may use the same type of load instructions and/or operations, such as only using gather load instructions and/or operations. In other embodiments, the types of load instructions and/or operations may use a combination of load instructions and/or operations, such as using a simple load instruction and/or operation and using gather load instruction and/or operation.

Figure 2:
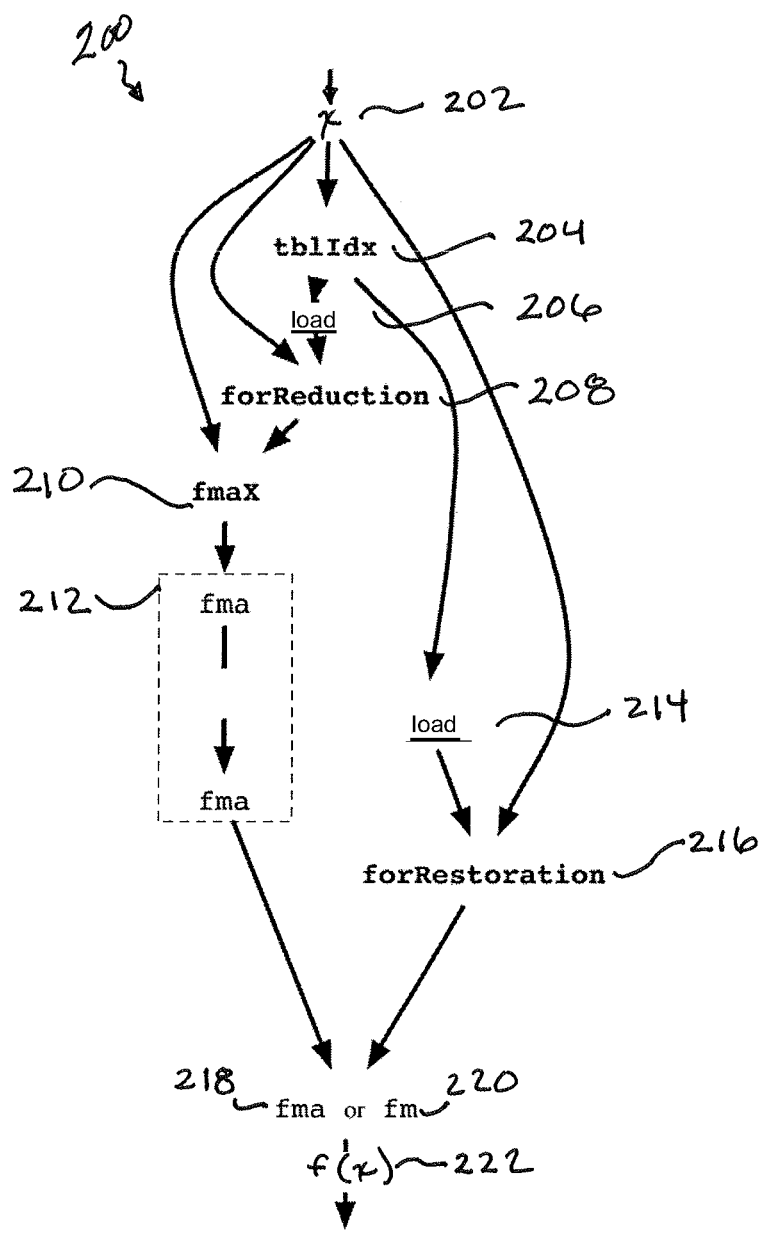
FIG. 2 is a data flowchart illustrating a first implementation of hardware instructions, according to embodiments of the present disclosure.

FIG. 2 is a data flowchart illustrating a first implementation 200 of performing one or more instructions in hardware of the processor 156, according to embodiments of the present disclosure.

In one or more embodiments, the one or more instructions, in the description of FIGS. 2-5, are either scalar or Single-Instruction-Multiple-Data (SIMD) instructions. In one or more aspects the SIMD instructions may provide the behavior for each SIMD slot. That is, the input, for example, input "x", may be one slot of the input SIMD argument, and the return value may be the corresponding slot of the SIMD result. In using scalar instructions, the load instructions or load operations may be scalar or vector load instructions or operations.

In one or more embodiments, in a load instruction, the processor 156 retrieves data from a level of memory, for example a memory of the processor, a level one cache memory, a level two cache memory, a level three cache memory, and/or a main memory. In a load instruction, the processor 156 retrieves data from a section of memory and loads the data into a register of the processor. In one or more embodiments, in a load instruction, the processor 156 loads data from arbitrary locations in memory into the registers of the processor 156. A load instruction may have a memory address with one or more offsets. For example, if, in a load instruction, data from four arbitrary locations in memory is loaded into a register, the load instruction may have a memory address with four offsets. The processor 156 loads the contents of the memory location identified by the memory address and the first offset into the first register, the contents of the memory location identified by the memory address and the second offset into the second register, the contents of the memory location identified by the memory address and the third offset into the third register, and the contents of the memory location identified by the memory address and the fourth offset into the fourth register. The first, second, third, and fourth registers may be slots of a vector register. That is, in a load instruction, the processor 156 retrieves arbitrarily placed memory locations and places them into a register in the processor 156. In one or more embodiments, a load instruction is a load instruction when using SIMD instructions. In other embodiments, a load instruction is a scalar load instruction when using scalar instructions. In one or more embodiments, the implementation utilizes separate load instructions, for example, the first implementation in an embodiment utilizes a separate load instruction.

In one or more embodiments, the processor 156 receives an input at 202. The input 202 may be represented as "x" in FIG. 2. In one or more embodiments, the input 202 includes one or more function arguments. For example, the input 202 may include two function arguments. Functions for which the input 202 includes two function arguments, by way of an illustrative but non-limiting example, may be: pow, divide, atan2, and/or hypot. It should be noted that the features of input 202 are equally applicable for inputs 302, 402, and 502. For example, each of inputs 302, 402, and 502 may include one or more function arguments. For example, each of inputs 302, 402, and 502 may include one or more functional arguments. In one or more embodiments, the program instructs the processor 156 to perform a first instruction, for example a table index instruction (tblIdx) 204, using the input 202. The input 202 for the table load instruction 204 may be one 64-bit value. In one or more embodiments, the input 202 is a floating-point number representing an argument at which a math function is to be evaluated. The floating-point number may be an IEEE 64-bit double precision number. In one or more embodiments, the input 202 may be a SIMD vector, each of whose slots represent an argument at which a math function is to be evaluated. In one or more embodiments, the math function is, for example, a log 2 (base-2 logarithm) function; however, it should be noted that this function is illustrative only and that other math functions, square root, logarithm, exponential, etc., and elementary and special functions may be evaluated and/or implemented.

In one or more embodiments, the program instructs the processor 156 to perform a table index instruction 204 to generate a lookup key. In one or more embodiments, the lookup key is the input to the load instructions 206 and 214, providing each of the load instructions 206 and 214 with memory locations to load into one or more registers, for example vector registers. In one or more embodiments, the input to the load instructions includes one or more offsets, in which an offset is provided for each SIMD slot. The memory addresses whose contents are to be loaded into a particular slot of a vector register may have a base address added to the offset corresponding to the particular slot.

To generate the lookup key, the processor 156 may use several variables representing a bit section of the input 202. For example, a sign variable, an exponent variable, a mantissa variable, and an exponent is zero ("expIsZero") variable. The sign variable may be a 1 bit value representing the sign bit of the input. The exponent variable may be an 11 bit value representing the exponent bits of the input. The mantissa variable may be a 52 bit value representing the fraction bits of the input. The exponent is zero (expIsZero) variable may be a 1 bit value that is true if the exponent is zero. In one or more embodiments, the table index instruction 204 instructs the processor 156 to extract the sign, exponent and fraction bits from the input 202. For example, the processor 156 extracts the sign, exponent, and fraction bits from the input 202, and saves these bits in the sign, exponent, and mantissa variables, respectively. The processor 156 determines that expIsZero is true if the exponent is zero, and that expIsZero is false if exponent is non-zero. The processor 156 determines whether the exponent is subnormal. If the exponent is subnormal, then the processor 156 normalizes the subnormal exponent by shifting the bits in the mantissa variable left until the first non-zero bit falls off. In one or more embodiments, the number of leading zeros in the mantissa variable may be used to construct the exponent of the normalized number. If the processor 156 determines that the expIsZero is true, the processor 156 returns the n most significant bits of the mantissa variable, which is the fraction bits of the input shifted left until the first non-zero bit falls off, as the generated lookup key. If the processor 156 determines that the expIsZero is false, the processor 156 returns the n most significant bits of the mantissa variable, which is the mantissa bits of the input, as the generated lookup key. n may be the width of the lookup key.

For example, the processor 156 may generate the lookup key using a table index instruction (tblIdx) 204 with the following functionality:

It should be noted that the above example is written in C programming language; however, the features of this example may be implemented in the hardware instructions of the processor 156. For example, the features may be implemented as logic gates in the processor 156.

In one or more embodiments, the processor 156 uses the lookup key as the input for a first load instruction at 206. The bits of the lookup key may include a number of offsets that a first load instruction uses to decide which memory locations to load into the registers of the processor. In one or more embodiments, the first load instruction is a hardware instruction existing on the processor 156. In one or more embodiments, the table index instruction 204 sends the lookup key to a register of the processor 156. The first load instruction 206, in an embodiment, is executed using the register as an input. In one or more embodiments, depending on the functionality of the load instruction, the load instruction may add a base address to each of the offsets obtained from the SIMD slots of the lookup key to obtain a target memory address corresponding to each of the SIMD slots of

```
// this instruction feeds the load
Word64 LogPreLookup(Word64 input) {
//// Following is a list of the variables used in this description:
//// sign is a 1-bit value representing the sign bit of input.
//// exponent is an 11 bit value representing the exponent bits of input.
//// mantissa is a 52-bit value representing the fraction bits of input.
//// expIsZero is a 1-bit value that is true if exponent is zero.
//// The bits(i,j,x) function returns the bits of x from position i up to but not including position j,
where bit 0 is the least significant bit.
    // Local variables
//// The countLeading0(i,x) function returns the number of leading zeroes in the i least significant
bits of x.
    Word64 sign, rest, exponent, mantissa, leading0s;
    bool expIsZero;
// Extract sign, exponent and mantissa bits from the input
// these operations extract the bits, so they do not require any gates
//// Let sign be the sign bit of input.
    sign = input >> 63;
//// Let exponent be the 11 exponent bits of input.
//// Let mantissa be the 52 fraction bits of input.
    rest = input % pow64(2,63);
    exponent = rest >> 52;
    mantissa = rest % pow64(2,52);
//// Let expIsZero be true if exponent is zero, and false otherwise.
    // check to see if the exponent is subnormal
    // requires tree of nors
    expIsZero = exponent == 0;
    /* normalize subnormals by shifting leading zeros in the mantissa until the first
     * non-zero bit falls off. The leading zeros are also used to construct the exponent
     * of the normalized number. */
//// Let leading0s be the number of leading zeroes in mantissa.
    leading0s = countLeading0(52, mantissa);
    // Calculate the lookup key using the first 12 bits of the mantissa (after possible shifting)
    // note: optimized implementation does the shifting without knowing in advance how many
leading zeros there are
//// If expIsZero is true,
////        return the n most significant bits of (mantissa shifted left by (leading0s + 1) bits).
//// Otherwise,
////        return the n most significant bits of mantissa.
    return expIsZero ? bits(52-n,52,mantissa<<(leading0s+1)) : bits(52-n,52,mantissa);
}
```

In the case of a SIMD implementation of the table index instruction (tblIdx) 204, the above example program shows the functionality and/or behavior for each SIMD slot. The input x represents one slot of the SIMD argument, and the return value is the corresponding SIMD slot of the SIMD lookup key. It should also be noted that the above example program is used to show the functionality and/or behavior of the table index instruction (tblIdx) 204.

the lookup key. The load instruction may load the contents of each target address into the corresponding slot of a vector register on the processor.

In one or more embodiments, having loaded the memory locations into the registers of the processor 156, a second instruction is invoked, for example a forReduction instruction 208. In one or more embodiments, the input to the forReduction instruction 208 includes two inputs, that is, the input 202 and the output of the load instruction 206. For example, in the case of a SIMD implementation, two inputs may be used in more than one slot, in which each input has multiple slots, for example, two inputs can have two 64-bit slots or four 32-bit slots.

To perform the forReduction instruction 208, the processor 156 uses the function input 202 and the output of the load instruction, i.e., the table value from the load instruction 206, to calculate at least one range reduction factor. The reduction factor may be used to calculate an associated value in a small fixed interval. The small fixed interval may be such that the desired mathematical function (or an intermediate function from which the desired function can be computed) can be accurately calculated on the input value 202 by a polynomial or other fast computation. For example, if the desired math function exp2 (base-2 exponential) is to be computed at an argument x specified by input 202, the processor 156 may compute the tblIdx instruction as follows: The processor 156 computes the integer part int(x) of x and the fractional part frac(x) of x, where $1<=\text{frac}(x)<=2$. The processor 152 computes a lookup key based on frac(x) to retrieve a pair of table values (c, 2pc), in which c is a table value near frac(x) and 2pc is an accurate approximation to 2 to the power of c. In cases in which a load is a separate load instruction as in the discussion related to FIG. 2, then the processor 156 executes the separate load instruction to process the load of c and 2pc. In some aspects, if a load operation is included as part of an instruction as in the discussion related to FIGS. 3-5, then the processor 156 executes the load operation to load c and 2pc into registers. In one or more embodiments, the load operation is a part of the tblForRed instruction (as discussed in the description related to FIG. 4), as part of the forReduction instruction (as discussed in the description related to FIG. 3 and FIG. 5), as part of the forRestoration instruction (as discussed in the description related to FIG. 3 and FIG. 5), or is a separate instruction (as discussed in the description related FIG. 2). In one or more embodiments, separate instructions are used to compute a polynomial approximation (p) to 2 to the power of (x−(int(x)+c)), as discussed in the description related to reference numbers 212, 308, 410, or 510 in FIGS. 2-5.

In one or more embodiments, to calculate the at least one range reduction factor of the forReduction instruction 208, the processor 156 uses several variables. For example, an input variable, a leftLookIn variable, a sign variable, an exponent variable, a mantissa variable, a lastBit variable, an expIsZero variable, a leading0s variable, an exponentComplemented variable, an unbiasedExponentSubNorm variable, a adjustedExponentComplemented variable, and an approx1ByInputX variable.

The input variable may be the input 202. The leftLookIn variable may be the output of the load instruction 206. The sign variable may be a 1 bit value representing the sign bit of the input. The exponent variable may be an 11 bit value representing the exponent bits of the input. The mantissa variable may be a 52 bit value representing the fractional bits of the input. The expIsZero variable may be a 1 bit value that is true if the exponent is zero.

In one or more embodiments, the forReduction instruction 208 instructs the processor 156 to extract the sign, exponent, and fraction bits from the input 202. For example, the processor 156 extracts the sign, exponent, and fraction bits from the input 202, and saves them in the sign, exponent, and mantissa variables, respectively.

In one or more embodiments, the processor 156 sets lastBit to the least significant bit of the input variable. The processor 156 determines that expIsZero is true if the exponent is zero, and that expIsZero is false if exponent is non-zero. The processor 156 sets the leading0s variable to the number of leading zeroes in the mantissa variable. The processor 156 sets the exponentComplemented variable to the bitwise complement of the exponent variable. The processor 156 sets the unbiasedExponentSubNorm variable to the sum of the hexadecimal number 3FF and the leading0s variable.

In one or more embodiments, if the processor 156 determines that the expIsZero variable is true, the processor 156 sets the adjustedExponentComplemented variable to the unbiasedExponentSubNorm variable. Otherwise, if the processor 156 determines that the expIsZero variable is false, the processor 156 sets the adjustedExponentComplemented variable to the exponentComplemented variable.

In one or more embodiments, the processor 156 calculates the sum of the adjustedExponentComplemented variable, the hexadecimal number 3FE, and the lastBit variable, multiplies this sum by the value 2 to the power of 51, performs a bitwise OR of the result of this multiplication with the mantissaOneByC variable, and sets the approx1ByInputX variable to the result of the OR.

In one or more embodiments, if the processor 156 determines that the sign, exponent, and mantissa variables are all zero, the processor 156 returns the hexadecimal number 7FC0000000000003 as the result of the forReduction instruction 208. In one or more embodiments, if the processor 156 determines that the sign and mantissa variables are both zero, and the exponent is the hexadecimal number 7FF, the processor 156 returns the hexadecimal number 7FC0000000000003 as the result of the forReduction instruction 208. In one or more embodiments, if the processor 156 determines that the sign variable is zero and the exponent variable is the hexadecimal number 7FF, the processor 156 returns zero as the result of the forReduction instruction 208. In one or more embodiments, if the processor 156 determines that the sign variable is 1, the processor 156 returns zero as the result of the forReduction instruction 208. In one or more embodiments, if the processor 156 does not make a determination based on the above embodiments, the processor 156 returns the approx1ByInputX variable as the result of the forReduction instruction 208.

For example, the processor 156 may perform the forReduction instruction 208 to calculate the at least one range reduction factor as follows:

```
// this instruction takes the load output and creates the range reduction factor
Word64 LogPostLookupLeft(Word64 input, Word64 leftLookIn) {
   //// Following is a list of the variables used in this description:
   //// sign is a 1-bit value representing the sign bit of input.
   //// exponent is an 11 bit value representing the exponent bits of input.
   //// mantissa is a 52-bit value representing the fraction bits of input.
   //// expIsZero is a 1-bit value that is true if exponent is zero.
   Word64 sign, rest, exponent, mantissa, exponentComplemented,
      unbiasedExponentSubNorm, adjustedExponentComplemented,
      approx1ByInputX, leading0s, lastBit, mantissaOneByC;
```

```
    bool expIsZero;
//// Let lastBit be the least significant bit of leftLookIn.
    lastBit = leftLookIn % 2;
//// Let mantissaOneByC be all but the least significant bit of leftLookIn.
    mantissaOneByC = leftLookIn >> 1;
    //we extract the mantissaOneByC and lastBit from the leftLookIn
// Extract sign, exponent and mantissa bits from the input
// these operations extract the bits, so they do not require any gates
//// Let sign be the sign bit of input.
    sign = input >> 63;
//// Let exponent be the 11 exponent bits of input.
//// Let mantissa be the 52 fraction bits of input.
    rest = input % pow64(2,63);
    exponent = rest >> 52;
    mantissa = rest % pow64(2,52);
//// Let expIsZero be true if exponent is zero, and false otherwise.
    // We check to see if the exponent is subnormal
    expIsZero = exponent == 0;
//// Let leading0s be the number of leading zeroes in mantissa.
    leading0s = countLeading0(52, mantissa);
//// Let exponentComplemented be the bitwise complement of the 11 exponent bits of input.
    // For normal inputs, we complement the exponent, which is calculated to $-e+1+$ |bias|.
    exponentComplemented = exponent^0x7FF;
//// Let unbiasedExponentSubNorm be the sum of the hexadecimal number 7FF and leading0s.
    // The operation to calculate the extended exponent is decomposed into two adder steps
    unbiasedExponentSubNorm = 0x7FF + leading0s; //combined both adds into one
//// If expIsZero is true, let adjustedExponentComplemented be unbiasedExponentSubNorm.
//// Otherwise, let adjustedExponentComplemented be exponentComplemented.
    adjustedExponentComplemented = expIsZero ? unbiasedExponentSubNorm :
exponentComplemented;
//// Let approx1ByInputX be
////           (the sum of adjustedExponentComplemented, the hexadecimal number 3FE, and lastBit),
////           multiplied by 2 to the power of 51, and then
////           OR'd with mantissaOneByC.
    // Calculating firstLookup requires a 12-bit adder, then concatenation of the mantissa of 1/c.
    approx1ByInputX = (adjustedExponentComplemented + 0x3FE + lastBit) * pow64(2,51) |
mantissaOneByC;
//// If sign, exponent, and mantissa are all 0,
////           return the hexadecimal number 7FC0000000000003.
//// Otherwise, if sign and mantissa are 0, and exponent is the hexadecimal number 7FF,
////           return the hexadecimal number 7FC0000000000003.
//// Otherwise, if sign is 0 and exponent is the hexadecimal number 7FF,
////           return 0.
//// Otherwise, if sign is 1,
////           return 0.
//// Otherwise,
////           return approx 1ByInputX.
    // Special input checking
    if (sign == 0 && exponent == 0 && mantissa == 0) return 0x7fc0000000000003
    if (sign == 0 && exponent == 0x7ff && mantissa == 0) return 0x7fc0000000000003;
    if (sign == 0 && exponent == 0x7ff) return 0;
    if (sign == 1) return 0;
    return approx1ByInputX;
}
```

It should be noted that the above example is written in C programming language; however, the features of this example may be implemented in the hardware instructions of the processor 156. For example, the features may be implemented as logic gates in the processor 156. It should also be noted that the above example program is used to show the functionality and/or behavior of the forReduction instruction 208.

Having returned at least one range reduction factor, e.g., the result of the forReduction instruction 208, the program instructs the processor 156 to perform an fmaX instruction at 210. In one or more embodiments, the processor 156 uses the at least one range reduction factor to execute an extended fused multiply add (fmaX) instruction. The fmaX instruction is an instruction to perform an extended-range floating point multiply-add. The format of one of the multiplicative arguments of the fmaX instruction may be nonstandard, having an extra exponent bit and one fewer fraction bit than the format of the arguments of the fma (fused multiply add) instruction. The nonstandard multiplicative argument of the fmaX instruction 210 may be fed by the range reduction factor produced by the forReduction instruction 208. The fmaX instruction may also have special exception handling to produce a non-standard output to help the algorithm avoid branches in the algorithm. In one or more embodiments, the processor 156 executes a varying number of fused multiply-adds (fma instructions) at 212 on the output of the fmaX instruction to evaluate a polynomial.

In one or more embodiments, having generated the lookup key at 204, the processor 156 inputs the lookup key into a second load instruction at 214. The bits of the lookup key may include a number of offsets that a second load instruction uses to decide which memory locations to load into the registers of the processor 156. In one or more embodiments, the second load instruction 214 is a hardware instruction existing on the processor 156. The output of the table index instruction 204 is sent to a register of the processor 156. The second load instruction 214 is executed using the register as an input. In one or more embodiments, depending on the functionality of the load instruction, the load instruction 214 may add a base address to each of the offsets obtained from the SIMD slots of the lookup key to obtain a target memory address corresponding to each of the SIMD slots of the lookup key. In one or more embodiments, the load instruction 214 loads the contents of each target address into the corresponding slot of a vector register on the processor 156.

In one or more embodiments, having loaded the memory locations into the registers of the processor 156, the program instructs the processor 156 to perform a third instruction 216, for example a forRestoration instruction. In one or more embodiments, the input to the forRestoration instruction includes two inputs, that is, the input 202 and the output of the second load instruction at 214. For example, in the case of a SIMD implementation, two inputs may be used in more than one slot, in which each input has multiple slots, for example, two inputs can have two 64-bit slots or four 32-bit slots. To perform the forRestoration instruction, the processor 156 uses the input 202 and the output of the second load instruction, i.e., the table value from the load instruction 214, to calculate at least one range reconstruction factor. The range reconstruction factor may be a value the processor 156 uses to transpose the result of the polynomial or other fast computation into the correct interval for the input 202. In one or more examples, the calculated value is an accurate function output for a specially chosen input value. For example, if the desired math function exp2 (base-2 exponential) is to be computed at an argument x specified by input 202, the processor 156 may compute the forRestoration instruction as follows. The processor 156 computes the integer part int(x) of x, adds a bias value, and puts the sum of int(x) and the bias in the exponent bits of the result of the forRestoration instruction. The processor 156 puts the looked-up value 2pc into the fraction bits of the result of the forRestoration instruction. In one or more embodiments, the result of the forRestoration instruction represents an approximation to (2 to the power of int(x)) multiplied by (2 to the power of c). To produce the final result, as depicted in reference numbers 220, 314, 418, 516 in FIGS. 2-5, the processor 156 multiplies the polynomial approximation (p) and the result of the forRestoration instruction, and produces a final result which is an approximation to (2 to the power of (x−(int(x)+c))) multiplied by (2 to the power of int(x)) multiplied by (2 to the power c), which is equal to 2 to the power of x and which is the desired result, exp2(x).

In one or more embodiments, to calculate the at least one value of the forRestoration instruction 216, the processor 156 may use several variables. For example, an input variable, a rightLookIn variable, a sign variable, an exponent variable, a mantissa variable, a rotation variable, a mantissaLog2C variable, an expIsZero variable, a leading0s variable, an exponentComplemented variable, an unbiasedExponentSubNorm variable, an impliedOneBit variable, a fixedLog2C variable, an exponentP1 variable, an unbiasedExponent variable, an eShifted variable, an npfixedLog2C variable, an ePlog2Cint variable, an isZero variable, a mantissaEplog2C variable, an expEplog2C variable, a signBit variable, and an approxLog2Input variable. The input variable may be the function input 202. The rightLookIn variable may be the output of the load instruction 214.

The sign variable may be a 1 bit value representing the sign bit of the input. The exponent variable may be an 11 bit value representing the exponent bits of the input. The mantissa variable may be a 52 bit value representing the fractional bits of the input. The expIsZero variable may be a 1 bit value that is true if the exponent is zero. In one or more embodiments, the forRestoration instruction 216 instructs the processor 156 to extract the sign, exponent and fraction bits from the input 202. For example, the processor 156 extracts the sign, exponent, and fraction bits from the input 202, and saves them in the sign, exponent, and mantissa variables, respectively.

In one or more embodiments, the processor 156 sets the rotation variable to the 4 least significant bits of the rightLookIn variable. The processor 156 sets mantissaLog2C to the 60 most significant bits of the rightLookIn variable. The processor 156 determines that expIsZero is true if the exponent is zero, and that expIsZero is false if the exponent is non-zero. The processor 156 sets the leading0s variable to the number of leading zeroes in the mantissa variable. The processor 156 sets the exponentComplemented variable to the bitwise complement of the exponent variable. The processor 156 sets the unbiasedExponentSubNorm variable to the sum of the hexadecimal number 3FF and the leading0s variable. The processor 156 sets the impliedOneBit variable to the complement of the 4th least significant bit of the rotation variable, ANDed with the 3rd least significant bit of the rotation variable. The processor 156 shifts the impliedOneBit variable left by m bits, adds the result to the mantissaLog2C variable, and saves the result in the mantissaMp1Bits variable. The processor 152 sets the fixedLog2C variable to the mantissaMp1Bits variable shifted left by the number of bits specified by the rotation variable. The processor 152 sets the exponentP1 variable to the sum of exponent variable and 1. The processor 152 sets the eShifted variable to the unbiasedExponent variable shifted left by the sum of k and m bits.

In one or more embodiments, if the processor 156 determines that the 11th least significant bit of the exponentP1 variable is 1, the processor 156 computes the exclusive OR of the fixedLog2C variable with the value 1 less than 2 to the power of the sum of k, m, and 11. In one or more embodiments, m represents a number of bits in the lookup key. In one or more embodiments, k represents the smallest exponent for values in the table.

In one or more embodiments, the processor 156 sets the ePlog2CInt variable to the k+m+11 least significant bits of the sum of the eShifted variable and the npfixedLog2C variable.

In one or more embodiments, if the processor 156 determines that the leadingZeroes variable is greater than 11+k, the processor 156 sets the isZero variable to true. Otherwise, if the processor 156 determines that the leadingZeroes variable is not greater than 11+k, the processor 156 sets the isZero variable to false.

In one or more embodiments, if the processor 156 determines that the isZero variable is true, the processor 156 sets the expEplog2C variable to zero. Otherwise, if the processor 156 determines that the isZero variable is false, the processor 156 sets the expEplog2C variable to the hexadecimal number 3FE, plus m, plus k, plus 11, minus the leadingZeroes variable, minus (m+1), minus k.

In one or more embodiments, if the processor 156 determines that the 11th least significant bit of the exponentP1 variable is 1, the processor 156 sets the signBit variable to zero. Otherwise, if the processor 156 determines that the 11th least significant bit of the exponentP1 variable is 0, the processor 156 sets the signBit variable to 1.

In one or more embodiments, the processor 156 sets the approxLog2Input variable to be the 64-bit number with the signBit variable as the most significant bit, the expElog2C variable as the next 11 most significant bits, and the mantissaEplog2C variable as the 52 least significant bits.

In one or more embodiments, if the processor 156 determines that the sign, exponent, and mantissa variables are all zero, the processor 156 returns the hexadecimal number FFF0000000000000 (representing negative infinity) as the result of the forRestoration instruction 216. In one or more embodiments, if the processor 156 determines that the sign and mantissa variables are both zero, and the exponent is the hexadecimal number 7FF, the processor 156 returns the hexadecimal number 7FF0000000000000 (representing positive infinity) as the result of the forRestoration instruction 216. In one or more embodiments, if the processor 156 determines that the sign variable is zero and the exponent variable is the hexadecimal number 7FF, the processor 156 returns the hexadecimal number 7FF8000000000000 (representing NaN [not a number]) as the result of the forRestoration instruction 216. In one or more embodiments, if the processor 156 determines that the sign variable is 1, the processor 156 returns the hexadecimal number 7FF8000000000000 (representing NaN [not a number]) as the result of the forRestoration instruction 216. In one or more embodiments, if the processor 156 does not make a determination based on the above embodiments, the processor 156 returns the approxLog2Input variable as the result of the forRestoration instruction 216.

For example, the processor 156 may perform the forRestoration instruction 216 to calculate the at least one range reconstruction factor as follows:

```
// instruction takes the load output and makes the range reconstruction factor
Word64 LogPostLookupRight(Word64 input, Word64 rightLookIn) {
//// Following is a list of the variables used in this description:
//// sign is a 1-bit value representing the sign bit of input.
//// exponent is an 11 bit value representing the exponent bits of input.
//// mantissa is a 52-bit value representing the fraction bits of input.
//// expIsZero is a 1-bit value that is true if exponent is zero.
    Word64 sign, rest, exponent, mantissa, leading0s, exponentComplemented,
        unbiasedExponentSubNorm, impliedOneBit, mantissaMp1Bits, fixedLog2C, exponentP1,
        unbiasedExponent, eShifted, npfixedLog2C, ePlog2CInt, leadingZeros, mantissaEplog2C,
        expEplog2C, signBit, approxLog2Input, expIsZero, rotation, mantissaLog2C;
    bool isZero;
//// Let rotation be the 4 least significant bits of rightLookIn
    rotation = rightLookIn % 16; //the last 4 bits of the rightLookin
//// Let mantissaLog2C be the 60 most significant bits of rightLookIn, right justified.
    mantissaLog2C = rightLookIn >> 4;
// Extract sign, exponent and mantissa bits from the input
// these operations extract the bits, so they do not require any gates
//// Let sign be the sign bit of input.
    sign = input >> 63;
//// Let exponent be the 11 exponent bits of input.
//// Let mantissa be the 52 fraction bits of input.
    rest = input % pow64(2,63);
    exponent = rest >> 52;
    mantissa = rest % pow64(2,52);
//// Let expIsZero be true if exponent is zero, and false otherwise.
    // We check to see if the exponent is subnormal
    expIsZero = exponent == 0;
//// Let leading0s be the number of leading zeroes in the 52 least significant bits of mantissa.
    leading0s = countLeading0(52, mantissa);
//// Let exponentComplemented be the bitwise complement of the 11 exponent bits of input.
    // For normal inputs, complement the exponent, which is calculated to -e+1+|bias|.
    exponentComplemented = exponent^0x7FF;
//// Let unbiasedExponentSubNorm be the sum of the hexadecimal number 3FF and leading0s.
    // The operation to calculate the extended exponent is decomposed into two adder steps
    unbiasedExponentSubNorm = 0x3FF + leading0s;
    /* The unique rotation bit assigned to 0 is 0xC. Every other rotation is lesser than 0xC.
     * The implied bit is the result of a |nand| operation of leading 2-bits of rotation.
     * We can use m+k bits to represent log_2(c). */
//// Let impliedOneBit be (the complement of bit 3 of rotation) ANDed with (bit 2 of rotation).
    impliedOneBit = 1^(bits(3,4,rotation) & bits(2,3,rotation));
//// Let mantissaMp1Bits be mantissaLog2C plus (impliedOneBit shifted left by m bits).
    mantissaMp1Bits = mantissaLog2C + (impliedOneBit << m);
    /* m+k+1 bits is used to represent log_2(c) as a fixed point integer, hence fixedLog2C is not
padded with extra zeros at the end */
//// Let fixedLog2C be mantissaMp1Bits shifted left by rotation bits.
    fixedLog2C = mantissaMp1Bits<<rotation;
    // Calculate the unbiased exponent for normal inputs.
//// Let exponentP1 be exponent + 1.
    exponentP1 = exponent + 1;
//// If expIsZero is true,
////     let unbiasedExponent be unbiasedExponentSubNorm.
//// Otherwise, if bit 10 of exponentP1 is 1, then
////     let unbiasedExponent be the 10 least significant bits of exponentP1.
//// Otherwise,
////     let unbiasedExponent be the 10 least significant bits of exponentComplemented.
    unbiasedExponent = expIsZero ? unbiasedExponentSubNorm :
            bits(0,10,(bits(10,11,exponentP1)==1 ? exponentP1 : exponentComplemented));
//// Let eShifted by unbiasedExponent shifted left by (k+m) bits.
    // Convert the adjusted exponent to fixed-point representation by shifting the unbiased
exponent by k+m
```

```
    eShifted = unbiasedExponent<<(k+m);
    // Add or subtract fixedLog2C from a fixed point exponent
//// If bit 10 of exponentP1 is 1, then
////     let npfixedLog2C be fixedLog2C.
//// Otherwise,
////     let fixedLog2C be 1 + (fixedLog2C exclusive OR'd with ((2 to the power (k+m+
           11)) - 1)).
    npfixedLog2C = bits(10,11,exponentP1) == 1 ? fixedLog2C : (1 +
(fixedLog2C^(pow64(2,k+m+11)-1)));
//// Let ePlog2CInt be the k+m+11 least significant bits of (eShifted + npfixedLog2C).
    ePlog2CInt = bits(0,k+m+11, eShifted + npfixedLog2C);
    // Round shift the fixed point |ePlog2CInt| by only 10+k-leadingZeros
//// Let leadingZeroes be the number of leading zeroes in the 11+k+m least significant bits of
ePlog2CInt.
    leadingZeros = countLeading0(11+k+m,ePlog2CInt);
//// Let isZero be true if leadingZeroes is greater than 11+k, otherwise false.
    isZero = leadingZeros > 11+k;
//// If isZero is true,
////     let mantissaEplog2C be 0.
//// Otherwise,
////     let mantissaEplog2C be the 52 least significant bits of (ePlog2CInt shifted left by
(leadingZeroes + 1)).
    mantissaEplog2C = isZero ? 0 : bits(0,52,ePlog2CInt<<(leadingZeros + 1));
    // Construct the exponent, and the result
//// If isZero is true,
////     let expEplog2C be 0.
//// Otherwise,
////     let expEplog2C be (the hexadecimal number 3FF) + (m+k+11-leadingZeros) −
           (m+1) − k.
    expEplog2C = isZero ? 0 : 0x3FF + (m+k+11-leadingZeros) − (m+1) −k;
//// If bit 10 of exponentP1 is 1, then
////     let signBit be 0.
//// Otherwise,
////     let signBit be 1.
    signBit = bits(10,11,exponentP1) == 1 ? 0 : 1;
//// Let approxLog2Input be the 64-bit floating-point number with
////     signBit as the sign bit (the most significant bit),
////     expEplog2C as the exponent bits (the next 11 most significant bits), and
////     mantissaEplog2C as the fraction bits (the 52 least significant bits).
    approxLog2Input = signBit*pow64(2,63) + expEplog2C*pow64(2,52) + mantissaEplog2C;
//// If sign, exponent, and mantissa are all 0,
////     return the hexadecimal number FFF0000000000000 (floating-point negative infinity).
//// Otherwise, if sign and mantissa are 0, and exponent is the hexadecimal number 7FF,
////     return the hexadecimal number 7FF0000000000000 (floating-point positive infinity).
//// Otherwise, if sign is 0 and exponent is the hexadecimal number 7FF,
////     return the hexadecimal number 7FF8000000000000 (floating-point NaN [not a number]).
//// Otherwise, if sign is 1,
////     return the hexadecimal number 7FF8000000000000 (floating-point NaN [not a number]).
//// Otherwise,
////     return approxLog2Input.
    // Account for special cases, and output accordingly
    if (sign == 0 && exponent == 0 && mantissa == 0) return 0xfff0000000000000;
    if (sign == 0 && exponent == 0x7ff && mantissa == 0) return 0x7ff0000000000000;
    if (sign == 0 && exponent == 0x7ff) return 0x7ff8000000000000;
    if (sign == 1) return 0x7ff8000000000000;
    return approxLog2Input;
}
```

It should be noted that the above example is written in C; however, the features of this example may be implemented in the hardware instructions of the processor 156. For example, the features may be implemented as logic gates in the processor 156. It should also be noted that the above example program is used to show the functionality and/or behavior of the forRestoration instruction 216.

In one or more embodiments, the processor 156 uses either the final fma type of hardware instruction 218 or a floating-point (fm) instruction 220 to combine the result of the polynomial approximation on the reduced interval from 212 with the range reconstruction factor from forRestoration instruction 216 to produce a result 222. The result of polynomial approximation may be based on a value reduced by the calculated range reduction factor. In one or more embodiments, the final fma instruction 218 is also a floating point instruction. In one or more embodiments, the final fma instruction 218 is a type of hardware instruction, such as a FNMA (fused negative multiply add), FMS (fused multiply-subtract), FNMS (fused negative multiply subtract) instruction, or other types of instructions known to one of ordinary skill in the art. In one or more embodiments, the processor 156 uses the final fma instruction 218 for mathematical functions, such as atan. In one or more embodiments, the processor 156 uses the fm instruction 220 for mathematical functions such as log.

In one or more embodiments, the processor 156 performs the forReduction instruction 208 once the output from the first load instruction 206 is received. In one or more embodiments, the processor 156 performs the forRestoration instruction 216 once the output from the load instruction 214 is received. The processor 156 exploits the load hardware on the processor 156 by avoiding functional overlap with an existing load operation, thereby requiring a reduced chip area. By utilizing a separate tblIdx instruction, first and second load instructions, a forReduction instruction, and a forRestoration instruction, the processor 156 may pipeline the instructions, resulting in functional parallelism (i.e., if a mathematical function is required to be computed for a plurality of arguments, once the result of the tblIdx instruction is computed for the first argument and fed to the load instruction for the first argument, the processor hardware implementing the tblIdx instruction may begin operating on the second argument while the load instruction is processing the first argument. Similarly, when the load instruction has finished processing the first argument and feeds the processed first argument to the forReduction instruction for the first argument, and the tblIdx instruction has finished processing the second argument and feeds the processed second argument to the load instruction for the second argument, the processor hardware implementing the tblIdx instruction may begin operating on the third argument while the load instruction is processing the second argument and the forReduction instruction is processing the first argument, and so on.). Moreover, by splitting the functionality of the separate tblIdx instruction, first and second load instructions, forReduction instruction, and forRestoration instruction into separate instructions, functional verification of the tblIdx, forReduction, and forRestoration instructions are simplified because there are fewer cases of inputs and outputs that need to be verified compared to a combined instruction that incorporates the load functionality internally.

Figure 3:
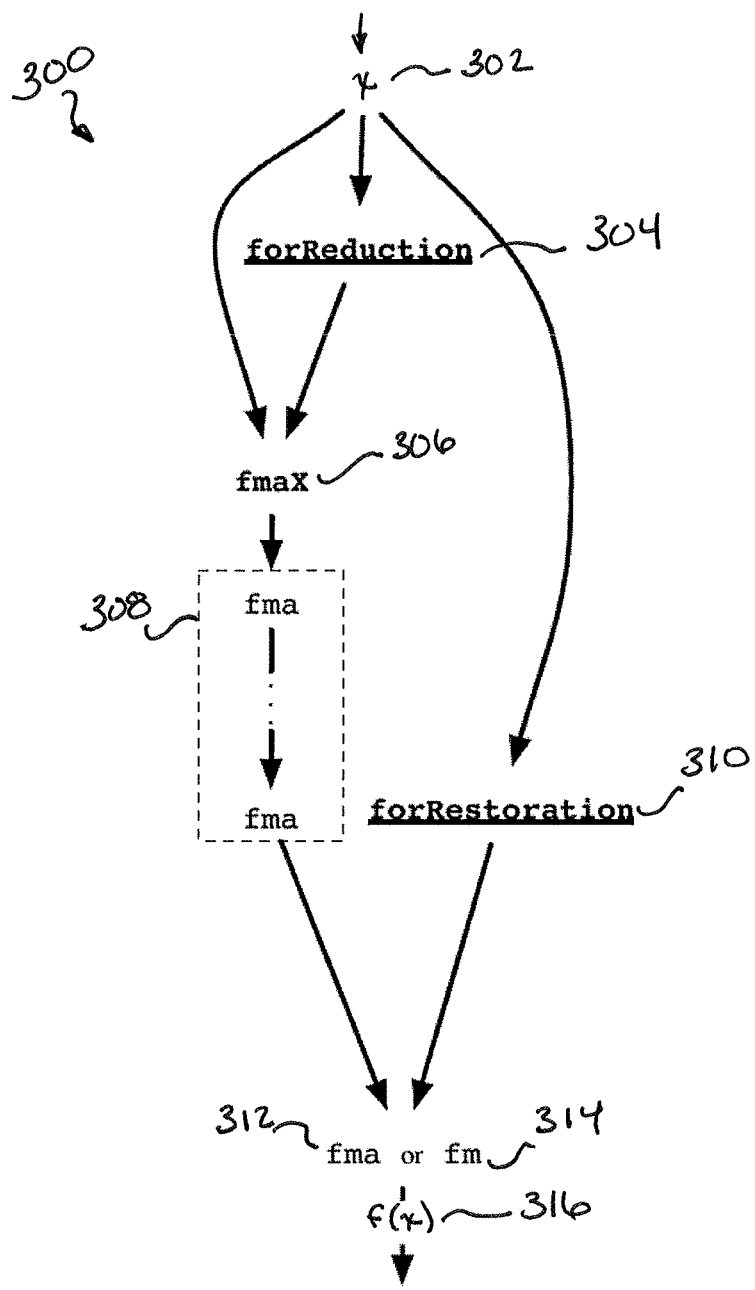
FIG. 3 is a data flowchart illustrating a second implementation of hardware instructions, according to embodiments of the present disclosure.
Figure 4:
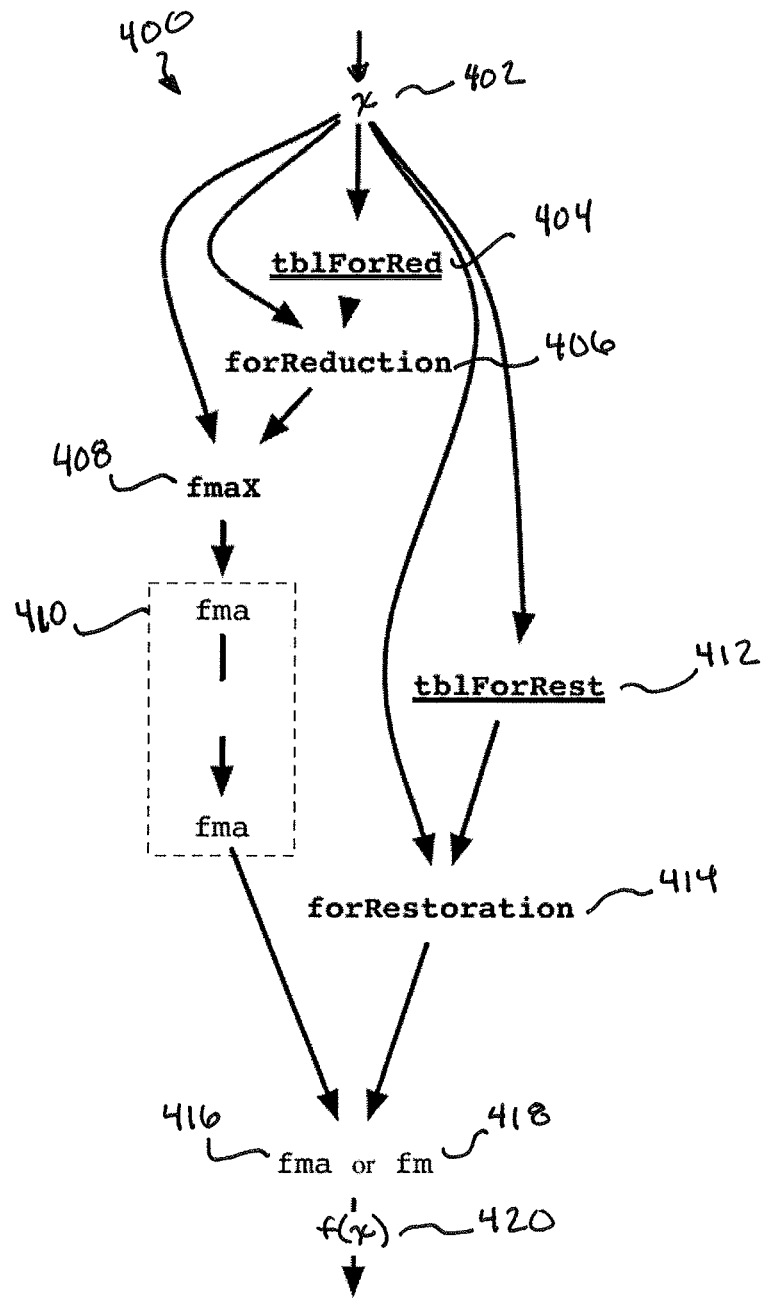
FIG. 4 is a data flowchart illustrating a third implementation of hardware instructions, according to embodiments of the present disclosure.
Figure 5:
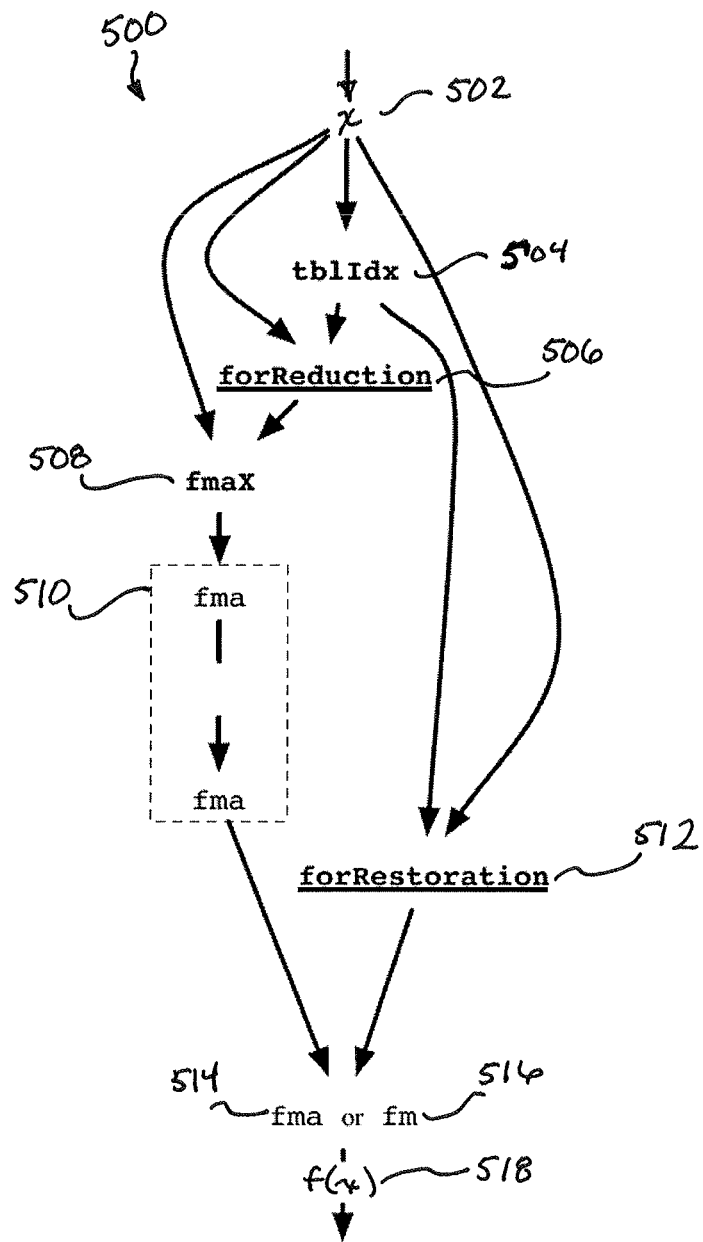
FIG. 5 is a data flowchart illustrating a fourth implementation of hardware instructions, according to embodiments of the present disclosure.

The following is a discussion of the implementations of performing one or more instructions in hardware of the processor 156 illustrated in FIGS. 3-5. It is noted that input 302, 402, and 502 each include the same or similar features as discussed with respect to input 202 (e.g., inputs 302, 402, and 502 may be represented as "x" in FIGS. 3-5, respectively. In one or more embodiments, the inputs 302, 402, and 502 are floating-point numbers each representing an argument at which a math function is to be evaluated.); fmaX instructions 306, 408, and 508 each include the same or similar features as discussed with respect to fmaX instruction 210; fma instructions 308, 410, and 510 each include the same or similar features as discussed with respect to fma instruction 212; final fma instructions 312, 416, and 514 each include the same or similar features as discussed with respect to final fma instruction 218; fm instructions 314, 418, and 516 each include the same or similar features as discussed with respect to fm instruction 220. As such, a redundant description of these elements will not be repeated.

It should be noted that the processor 156 performs the one or more operations of a related instruction before performing the one or more operations of a subsequent instruction. For example, in a first instruction 304, the related operations a processor 156 may perform are a first load operation preparing data in a lookup for a first load operation; performing the first load operation; and processing the result of the first load operation to generate a range reduction factor, e.g., forReduction instruction 304. Having generated the range reduction factor, the processor moves to performing the fmaX instruction 306.

FIG. 3 is a data flowchart illustrating a second implementation 300 of performing one or more instructions in hardware of the processor 156, according to embodiments of the present disclosure. In one or more embodiments, an implementation utilizes integrated load operations, for example, the second implementation in an embodiment utilizes integrated load operations.

In one or more embodiments, the processor 156 receives an input 302. The program instructs the processor 156 to use a first instruction at 304, for example a forReduction instruction. In one or more embodiments, having received the forReduction instruction, the processor 156 prepares data in a lookup for a first load operation; performs the first load operation; and processes the result of the first load operation to generate at least one range reduction factor. That is, in response to receiving the forReduction instruction 304, the processor 156 prepares data in a lookup for a first load operation; performs the first load operation; and processes the result of the first load operation to generate the at least one range reduction factor. In one or more embodiments, the processor 156 prepares the data in a lookup similar to the table index instruction at 204. In one or more embodiments, the processor 156 performs the first load operation similar to the load instruction at 206. In one or more embodiments, the processor 156 processes the input 302 and the output of the load operation in a forReduction operation, similar to the forReduction instruction at 208, to generate at least one range reduction factor. In one or more embodiments, the forReduction instruction 304 shares a portion of the processor hardware that exists as part of the load instruction 206.

In one or more embodiments, having generated at least one range reduction factor, the program instructs the processor 156 to perform the fmaX instruction 306. The processor 156 uses the input 302 and the at least one range reduction factor from the forReduction instruction 304 as inputs for the fmaX instruction 306. The processor 156 performs the fmaX instruction 306 and the fma instructions 308 in a similar manner as the fmaX instruction 210 and the fma instructions 212 discussed above.

In one or more embodiments, the program instructs the processor 156 to perform a second instruction 310, for example a forRestoration instruction 310. In one or more embodiments, in response to receiving the forRestoration instruction 310, the processor 156 prepares data in a lookup for a second load operation; performs the second load operation; and processes the result of the second load operation to obtain at least one range reconstruction factor. In one or more embodiments, the processor 156 prepares data in a lookup, similar to the table load instruction at 204, for a load operation. In one or more embodiments, the processor 156 in implementation 300 performs the second load operation similar to the load instruction at 214. In one or more embodiments, the processor 156 processes the result of the load operation in a forRestoration operation, similar to the forRestoration instruction at 216, to generate at least one range reconstruction factor.

In one or more embodiments, the processor 156 uses either the final fma instruction 312 or fm instruction 314 to combine the result of the polynomial approximation on the reduced interval from instruction 308 with the at least one range reconstruction factor from instruction 310 to produce a result 316. The result of polynomial approximation may be based on a value reduced by the calculated range reduction factor. In one or more embodiments, the final fma instruction 312 is also a floating point instruction. In one or more embodiments, the final fma instruction 312 is a type of hardware instruction, such as a FNMA (fused negative multiply add), FMS (fused multiply-subtract), FNMS (fused negative multiply subtract) instruction, or other types of instructions known to one of ordinary skill in the art. In one or more embodiments, the processor 156 uses the final fma instruction 312 for mathematical functions such as atan. In one or more embodiments, the processor 156 uses the fm instruction 314 for mathematical functions such as log.

In one or more embodiments, processor 156 performs forReduction instruction 304 and forRestoration instruction 310 in parallel. In other embodiments, the processor 156 performs the forReduction instruction 304 and forRestoration instruction 310 serially. In one or more embodiments, the processor 156 exploits the load hardware on the processor 156 by making use of hardware implementing a load instruction, in the implementation of the load operations in the forReduction instruction 304 and forRestoration instruction 310, thereby resulting in a reduced chip area. By utilizing separate forReduction instructions and forRestoration instructions in parallel, the processor may pipeline the instructions resulting in functional parallelism.

FIG. 4 is a data flowchart illustrating a third implementation 400 of performing one or more instructions in hardware of the processor 156, according to embodiments of the present disclosure. In one or more embodiments, the third implementation utilizes an indexing scheme integrated with a load operation.

In one or more embodiments, the processor 156 receives an input 402. The program instructs the processor 156 to use a first instruction at 404, for example a tblForRed instruction (i.e., a table load for reduction instruction) 404. In one or more embodiments, in response to receiving the tblForRed instruction 404, the processor 156 prepares data in a lookup, similar to the table load instruction at 204, for a first load operation, and performs the first load operation, similar to the load instruction at 206.

In one or more embodiments, having performed the tblForRed instruction 404, the processor 156 uses a second instruction at 406, for example a forReduction instruction 406. The processor 156 uses input 402 and the output of the load operation of the tblForRed instruction 404 as inputs for the forReduction instruction 406. The processor 156 performs the forReduction instruction, similar to the forReduction instruction at 208, to generate at least one range reduction factor.

In one or more embodiments, having generated the at least one range reduction factor in response to the forReduction instruction 406, the program (processor) invokes the fmaX instruction 408. The processor 156 uses the input 402 and the at least one range reduction factor from the forReduction instruction 406 as inputs for the fmaX instruction 408. The processor 156 performs the fmaX instruction 408 and the fma instructions 410 in a manner similar to the fmaX instruction 210 and the fma instructions 212 discussed above.

In one or more embodiments, the program invokes a third instruction at 412, for example a tblForRest instruction (i.e., a table load for restoration instruction) 412. In one or more embodiments, in response to receiving the tblForRest instruction 412, the processor 156 prepares data in a lookup, similar to the table index instruction at 204, for a second load operation, and performs the second load operation similar to the load instruction at 214.

In one or more embodiments, the program invokes a fourth instruction at 414, for example a forRestoration instruction 414. The processor 156 uses input 402 and the output of the load operation of the tblForRest instruction 412 as inputs for the forRestoration instruction 414. The processor 156 performs the forRestoration instruction, similar to the forRestoration instruction at 216, to generate at least one range reconstruction factor.

In one or more embodiments, the processor 156 uses either the final fma instruction 416 or fm instruction 418 to combine the result of the polynomial approximation on the reduced interval from instruction 410 with the at least one range reconstruction factor from instruction 414 to produce a result 420. The result of polynomial approximation may be based on a value reduced by the calculated range reduction factor. In one or more embodiments, the final fma instruction 416 is also a floating point instruction. In one or more embodiments, the final fma instruction 416 is a type of hardware instruction, such as a FNMA (fused negative multiply add), FMS (fused multiply-subtract), FNMS (fused negative multiply subtract) instruction, or other types of instructions known to one of ordinary skill in the art. In one or more embodiments, the processor 156 uses the final fma instruction 416 for mathematical functions such as atan. In one or more embodiments, the processor 156 uses the fm instruction 418 for mathematical functions such as log.

In one or more embodiments, the processor 156 performs the forReduction instruction 406 when the output from the tblForRed instruction 404 is received. In one or more embodiments, the processor 156 performs the forRestoration instruction 414 once the output from the tblForRest instruction 412 is received. The processor 156 exploits the load hardware on the processor 156 by making use of hardware implementing a load instruction, in the implementation of the load operations in the tblForRed instruction 404 and the tblForRest instruction 412, thereby resulting in a reduced chip area. By utilizing separate tblForRed, forReduction, tblForRest, and forRestoration instructions, the processor may pipeline the instructions (in an analogous manner to the pipelining described with respect to the discussion of FIG. 2), resulting in functional parallelism. Moreover, functional verification of the instructions is simplified as there are fewer cases of inputs and outputs that need to be verified compared to combined instructions.

FIG. 5 is a data flowchart illustrating a fourth implementation 500 of performing one or more instructions in hardware of the processor 156, according to embodiments of the present disclosure. In one or more embodiments, the fourth implementation utilizes a common indexing scheme.

In one or more embodiments, the processor 156 receives an input 502. The program instructs the processor 156 to perform a first instruction at 504, for example a tblIdx (i.e., a table index instruction) 504. The processor 156 may use the tblIdx instruction 504 to prepare data in a lookup, similar to the table index instruction at 204, for one or more load operations, and which may be used for multiple table lookups.

In one or more embodiments, having performed the tblIdx instruction 504, the processor 156 performs a second instruction at 506, for example, a forReduction instruction 506. The processor 156 uses input 502 and the output of the tblIdx instruction as inputs for the forReduction instruction. In one or more embodiments, the processor 156 uses the output of the tblIdx instruction 504 to perform a first load operation, similar to the load instruction at 206. In one or more embodiments, the processor 156 processes the input 502 and the output of the first load operation in the forReduction instruction 506, similar to the forReduction instruction at 208, to generate at least one range reduction factor.

In one or more embodiments, having generated at least one range reduction factor in response to the forReduction instruction 506, the processor 156 performs the fmaX instruction 508. The processor 156 uses the input 502 and the at least one range reduction factor from the forReduction instruction 506 as inputs for the fmaX instruction 508. The processor 156 performs the fmaX instruction 508 and the fma instruction 510 in a similar manner as the fmaX instruction 210 and the fma instruction 212 discussed above.

In one or more embodiments, the processor 156 performs a third instruction at 512, for example a forRestoration instruction 512. The processor 156 uses the output of the tblIdx instruction at 504 and the input 502 as inputs for the forRestoration instruction 512. In one or more embodiments, having received the forRestoration instruction 512, the processor 156 performs a second load operation, and processes the result of the second load operation in a forRestoration operation to obtain at least one range reconstruction factor. In one or more embodiments, the processor 156 uses the output of the tblIdx at 504 to perform the second load operation, in a manner similar to the load instruction at 214. In one or more embodiments, the processor 156 processes the result of the load operation in a forRestoration operation, in a manner similar to the forRestoration instruction at 216, to generate at least one range reconstruction factor.

In one or more embodiments, the processor 156 uses either the final fma instruction 514 or fm instruction 516 to combine the result of the polynomial approximation on the reduced interval from 510 with the at least one range reconstruction factor from instruction 512 to produce a result 518. The result of polynomial approximation may be based on a value reduced by the calculated range reduction factor. In one or more embodiments, the final fma instruction 514 is also a floating point instruction. In one or more embodiments, the final fma instruction 514 is a type of hardware instruction, such as a FNMA (fused negative multiply add), FMS (fused multiply-subtract), FNMS (fused negative multiply subtract) instruction, or other types of instructions known to one of ordinary skill in the art. In one or more embodiments, the processor 156 uses the final fma instruction 514 for mathematical functions, such as atan. In one or more embodiments, the processor 156 uses the fm instruction 516 for mathematical functions such as log.

In one or more embodiments, the processor 156 performs the forReduction instruction 506 once the output from the tblIdx at 504 and the input at 502 is received. In one or more embodiments, the processor 156 performs the forRestoration instruction 512 once the output from the tblIdx at 504 and the input at 502 is received. The processor 156 exploits the load hardware on the processor 156 by making use of hardware implementing a load instruction, in the implementation of the load operations in the forReduction instruction 506 and the forRestoration instruction 512, thereby resulting in a reduced chip area. By utilizing separate tblIdx, forReduction, and forRestoration instructions, the processor may pipeline the instructions (in an analogous manner to the pipelining described in the discussion of FIG. 2), resulting in functional parallelism. Moreover, functional verification of the instructions is simplified because there are fewer cases of inputs and outputs that need to be verified compared to combined instructions.

While the illustrative embodiments described above are preferably implemented in hardware, such as in units and circuitry of a processor, various aspects of the illustrative embodiments may be implemented in software as well. For example, it will be understood that each block of the flowchart illustrations in FIG. 2-5, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system having one or more processors, the system configured to:
perform a hardware reduction instruction using an input to calculate at least one range reduction factor of the input;
perform a hardware restoration instruction using the input to calculate at least one range restoration factor of the input; and
perform a final fused multiply add (FMA) type of hardware instruction or a floating-point multiply (FM) hardware instruction by combining a value reduced by the at least one range reduction factor with the at least one range restoration factor.

2. The system of claim 1, further configured to:
generate, using the input, a lookup key, via a table index instruction, wherein the lookup key provides memory addresses of data to be loaded into one or more registers.

3. The system of claim 2, further configured to:
perform a load hardware instruction, using the lookup key as an input, by loading data at the memory addresses specified by the lookup key into the one or more registers.

4. The system of claim 3, wherein when performing the hardware reduction instruction, the system is further configured to:
perform the hardware reduction instruction using the input and a result of the load hardware instruction as inputs to calculate the at least one range reduction factor.

5. The system of claim 3, wherein when performing the hardware restoration instruction, the system is configured to:
perform the hardware restoration instruction using the input and a result of the load hardware instruction as inputs to calculate the at least one range restoration factor.

6. The system of claim 1, further configured to:
execute an extended fused multiply add hardware instruction using the at least one range reduction factor as an input; and
execute one or more fused multiply add hardware instructions on an output of the extended fused multiply add hardware instruction.

7. The system of claim 1, wherein when performing the hardware reduction instruction, the system is configured to:
generate, using the input, a lookup key for a load operation, the lookup key providing memory addresses of data to be loaded into one or more registers;
perform the load operation, using the lookup key as an input, by loading data at the memory addresses specified by the lookup key into the one or more registers; and
process a result of the load operation to calculate the at least one range reduction factor.

8. The system of claim 1, wherein when performing the hardware restoration instruction, the system is configured to:
generate, using the input, a lookup key for a load operation, the lookup key providing memory addresses of data to be loaded into one or more registers;
perform the load operation, using the lookup key as an input, by loading data at the memory addresses specified by the lookup key into the one or more registers; and
process a result of the load operation to calculate the at least one range restoration factor.

9. The system of claim 1, further configured to:
perform, using the input, a table index instruction to generate a lookup key, wherein the lookup key provides memory addresses of data to be loaded into one or more registers; and
perform a load operation, using the lookup key as an input, by loading data at the memory addresses specified by the lookup key into the one or more registers.

10. The system of claim 9, wherein when performing the hardware reduction instruction, the system is further configured to:
perform the hardware reduction instruction using the input, and the output of the load operation, as inputs to calculate the at least one range reduction factor.

11. The system of claim 9, wherein when performing the hardware restoration instruction, the system is further configured to:
perform the hardware restoration instruction using the input, and the output of the load operation, as inputs to calculate the at least one range restoration factor.

12. The system of claim 1, further configured to:
generate, using the input, a lookup key, via a table index instruction, wherein the lookup key provides memory addresses of data to be loaded into one or more registers.

13. The system of claim 12, wherein when performing the hardware reduction instruction, the system is further configured to:
perform, using the lookup key and the input as inputs, a load operation, by loading data at the memory addresses specified by the lookup key into the one or more registers; and
process a result of the load operation to calculate the at least one range reduction factor.

14. The system of claim 12, wherein when performing the hardware restoration instruction, the system is further configured to:
perform, using the lookup key and the input as inputs, a load operation, by loading data at the memory addresses specified by the lookup key into the one or more registers; and
process a result of the load operation to calculate the at least one range restoration factor.

15. A computer program product comprising:
a non-transitory computer-readable storage medium having program instructions embodied therewith, the program instructions executable by one or more processors, the program instructions when executed by the one or more processors cause the processor to:
perform a hardware reduction instruction using an input to calculate at least one range reduction factor of the input;
perform a hardware restoration instruction using the input to calculate at least one range restoration factor of the input; and
perform a final fused multiply add (FMA) type of hardware instruction or a floating-point multiply (FM) hardware instruction by combining a value reduced by the at least one range reduction factor with the at least one range restoration factor.

16. The computer program product of claim 15, further comprising instructions executable by one or more processors, the program instructions when executed by the processor cause the processor to:

generate, using the input, a lookup key, via a table index instruction, wherein the lookup key provides memory addresses of data to be loaded into one or more registers.

17. The computer program product of claim 16, further comprising instructions executable by one or more processors, the program instructions when executed by the processor cause the processor to:

perform a load hardware instruction, using the lookup key as an input, by loading data at the memory addresses specified by the lookup key into the one or more registers.

18. The computer program product of claim 17, further comprising instructions executable by one or more processors, the program instructions when executed by the processor cause the processor to:

when performing the hardware reduction instruction, perform the hardware reduction instruction using the input and a result of the load hardware instruction as inputs to calculate the at least one range reduction factor.

19. The computer program product of claim 17, further comprising instructions executable by one or more processors, the program instructions when executed by the processor cause the processor to:

when performing the hardware restoration instruction, perform the hardware restoration instruction using the input and a result of the load hardware instruction as inputs to calculate the at least one range restoration factor.

20. The computer program product of claim 15, further comprising instructions executable by one or more processors, the program instructions when executed by the processor cause the processor to:

execute an extended fused multiply add hardware instruction using the at least one range reduction factor as an input; and execute one or more fused multiply add hardware instructions on an output of the extended fused multiply add hardware instruction.

21. The computer program product of claim 15, further comprising instructions executable by one or more processors, the program instructions when executed by the processor cause the processor to:

when performing the hardware reduction instruction, generate, using the input, a lookup key for a load operation, the lookup key providing memory addresses of data to be loaded into one or more registers;

perform the load operation, using the lookup key as an input, by loading data at the memory addresses specified by the lookup key into the one or more registers; and process a result of the load operation to calculate the at least one range reduction factor.

22. The computer program product of claim 15, further comprising instructions executable by one or more processors, the program instructions when executed by the processor cause the processor to:

when performing the hardware restoration instruction, generate, using the input, a lookup key for a load operation, the lookup key providing memory addresses of data to be loaded into one or more registers;

perform the load operation, using the lookup key as an input, by loading data at the memory addresses specified by the lookup key into the one or more registers; and process a result of the load operation to calculate the at least one range restoration factor.

23. The computer program product of claim 15, further comprising instructions executable by one or more processors, the program instructions when executed by the processor cause the processor to:

perform, using the input, a table index instruction to generate a lookup key, wherein the lookup key provides memory addresses of data to be loaded into one or more registers; and perform a load operation, using the lookup key as an input, by loading data at the memory addresses specified by the lookup key into the one or more registers.

24. The computer program product of claim 23, further comprising instructions executable by one or more processors, the program instructions when executed by the processor cause the processor to:

when performing the hardware reduction instruction, perform the hardware reduction instruction using the input, and the output of the load operation, as inputs to calculate the at least one range reduction factor.

25. The computer program product of claim 23, further comprising instructions executable by one or more processors, the program instructions when executed by the processor cause the processor to:

when performing the hardware restoration instruction, perform the hardware restoration instruction using the input, and the output of the load operation, as inputs to calculate the at least one range restoration factor.

\* \* \* \* \*